United States Patent Office 3,707,392
Patented Dec. 26, 1972

3,707,392
METHOD OF SENSITIZATION OF AN ELECTRO-PHOTOGRAPHIC MATERIAL
Satoru Honjo, Seiichi Taguchi, Masaaki Takimoto, and Hajime Miyatsuka, Asaka-shi, Japan, assignors to Fuji Photo Film Co., Ltd., Kanagawa, Japan
Filed Jan. 21, 1970, Ser. No. 4,711
Claims priority, application Japan, Jan. 21, 1969, 44/4,248
Int. Cl. G03g 5/00, 7/00; G03c 1/00
U.S. Cl. 117—201
5 Claims

ABSTRACT OF THE DISCLOSURE

A method of forming an electrophotographic light-sensitive coating on a support by coating a homogeneous coating mixture comprising photoconductive zinc oxde adsorbing one or more kind of sensitizing dye selected from the group comprising cyanine and merocyanine, said dye having a substantially planar molecular structure and being capable of forming a J-aggregate when adsorbed on zinc oxide surface, exhibiting a sharp spectral absorption due to said aggregate, and an organic solvent solution of a water-insoluble electrically insulating film-forming resinous binder, said zinc oxide being dispersed in said solution, which is characterized by that said coating mixture contains 1% to 30% water based on the weight of zinc oxide incorporated therein, so as to give rise to a stable J-aggregate on the electrophotographic light-sensitive coating finally obtained from said mixture.

BACKGROUND OF THE INVENTION

Figure 1:
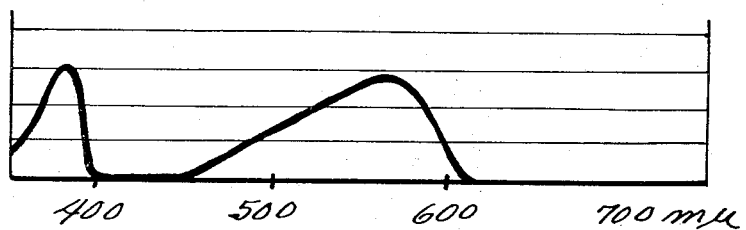

This invention relates to a sensitization method of an electrophotographic light sensitive material, and particularly to spectral sensitization of photoconductive zinc oxide.

Spectral sensitization of zinc oxide is widely under practice by making a variety of dyestuff adsorbed on the surface of finely-divided zinc oxide. Dye adsorption is carried out by any of the following methods:

(1) Immersing zinc oxide powder in a dye solution.
(2) Adding a dye solution into a suspension comprising zinc oxide and a resinous binder solution.
(3) Dyeing with a dye solution a thin coating of photoconductive composition comprising zinc oxide and a resinous binder provided on a support.

Suitable spectral sensitizing dyes include xanthene, triphenylmethane, anthraquinone, azo, cyanine, merocyanine dyes.

In general, zinc oxide coating necessitates an insulating resinous binder in which zinc oxide powder is uniformly dispersed, the resulting mixture being coated on a support. Suitable resinous materials for use in the present purpose include silicone, alkyd, polyvinylchloride, polyvinyl acetate, copolymer of vinylchloride and vinylacetate, polystyrene, polyalkylmethacrylate, polyalkylacrylate, styrene/butadiene copolymer, epoxide, epoxyester resins, and etc.

Now, a great difficulty arises when one intends to utilize so-called J-aggregates of cyanine or merocyanine dyes for spectral sensitization of zinc oxide, though the J-aggregate is widely used in silver halide emulsion technology.

A clear difference proved to exist between the ease with which a J-aggregate of a cyanine or merocyanine dye can be formed on the surface of zinc oxide and silver halide crystals.

Many research groups have reported their experimental results which support the above difference, among which Prof. H. Frieser et al. have reported, at the International Colloquim on the Photographic Interaction between Radiation and Matters at 1966, that spectral sensitization of zinc oxide photoconduction by J-aggregates of dyes is quite difficult, see pre-prints for SPSE for the above colloquim, October 1966, Washington, D.C., pages 65 and 66, report entitled "Analogous Considerations of the Spectral Sensitization of Different Photographic Systems" by H. Frieser and M. Schlesinger. This report has also been published in Photographic Science and Engineering, vol. 12, No. 1, pp. 17–26, 1968.

Recently, electrophotographic coatings produced by the use of aqueous emulsions of resinous binders are accepting an increased significance. In such coating formulations, cyanine or merocyanine dyes are more easily adsorbed and sometimes result in J-aggregation on zinc oxide surface than in organic coating formulations.

The inventors have found a new method of stably forming J-aggregates of cyanine and related dyestuffs on zinc oxide surface in electrophotographic light-sensitive coatings provided by coating mixtures comprising photoconductive zinc oxide dispersed in organic solvent solutions of resinous binders, as a result of an extensive investigation of spectral sensitization technique.

SUMMARY OF THE INVENTION

The principal object of the present invention is, accordingly, to provide a method of spectral sensitization of zinc oxide, and of forming an improved zinc oxide electrophotographic coating.

Another object of the present invention is to provide a method of spectral sensitization of zinc oxide with cyanine dyes and merocyanine, which are widely used for the sensitization of silver halide crystals, and to provide such method based on J-aggregates of these dyes.

Cyanine or merocyanine dyes which have planar molecular structures are well known to exhibit, in addition to their intrinsic optical absorption, absorptions owing to aggregated molecules. Among these additonal absorption bands, there is known an intense, sharp one which appears at a longer wave length than that of the intrinsic one, and which is considered to be due to J-aggregate. This sharp band has provided an effective means for sensitizng silver halide photographc materials.

In case of zinc oxide electrophotographic layers, especially those prepared from coating mixtures employing organic solvents, formation, of J-aggregates on zinc oxide and accordingly, spectral sensitization therewith was rarely observed even with the use of cyanine or merocyanine dyes as was mentioned by Prof. H. Frieser. A detailed description on J-aggregates of cyanine dyes can be found in the book "The Theory of the Photographic Process" (third edition) by Dr. C. E. K. Mees and T. H. James (1966), pp. 244–246, published by Macmillan Co.

Other certain groups investigated the photoconductivity of zinc oxide utilizing zinc oxide powders which adsorbed cyanine or merocyanine dyes. Some of the groups reported the spectral sensitization of zinc oxide by the J-aggregates of the dyes. It should be remembered that the J-band sensitization could always be recognized in zinc oxide powder layers, i.e., free from film-forming resinous binders in the form of photocurrent increase therethrough.

Extensive experiments by the inventors revealed remarkable effect of resinous binders on the mechanisms of spectral sensitization on zinc oxide; even when an optical absorption due to the J-aggregate of a cyanine or a merocyanine dye and a corresponding spectral response of photocurrent was observed in a dye-adsorbed zinc oxide powder, such absorption band as well as the spectral response disappeared after the powder was dispersed in an insulating resinous binder and the resulting mixture was formed into a thin coating. The disappearance of the J-band, which cannot be explained theoretically at present, occurs at the very early stage of mixing with the binder. Mixing operation at darkness to eliminate possible photocatalytic activity of zinc oxide also resulted in the same disappearance of J-band. Considering these observations, it may be concluded that in order to realize J-band sensitization in a zinc oxide-resin coating improvement or modification of mixing procedure or formation of a J-aggregate which can suffer mechanical mixing action is essential.

The technique of the present invention has made it possible to form a stable J-aggregate of a dye on the surface of zinc oxide which can stand the blending operation with a film-forming binder, thus providing a new method of spectral sensitization of photoconductivity of zinc oxide with cyanine or merocyanine dyes.

Finely-divided zinc oxide is known to adsorb moisture from an ambient atmosphere when kept in air. It is also known that the adsorbed water molecules exert a remarkable effect on the photoconductive property of the zinc oxide, though the detailed mechanism of this effect is not clear. Besides cyanine or merocyanine dyes are more effectively adsorbed onto zinc oxide surface in the aqueous or water-methanol solution.

It has been found out that a clear change of color takes place on the dye-adsorbed zinc oxide powder in the course of volatilization of the solvent of the dye solution, which phenomena could be explained by the change of the moisture content in the zinc oxide powder. In case when a cyanine dye was adsorbed on the surafce of zinc oxide powder from a solution thereof having a mixture of water and methanol as solvent, an initial color due to the J-aggregate of the dye disappeared as the solvent evaporated, changing into another color due to ordinary-adsorption of the dye. In case when the dye adsorption was carried out with a methanol solution of the dye, the J-adsorption appeared in an intermediate step of powder drying; but it again disappeared on the completely dried powder. These experimental results disclose that the J-aggregate is temporarily formed on zinc oxide when the powder contains a suitable amount of water. In the former case, the more volatile methanol evaporates first, bringing about a moistened state favorable for forming J-aggregate, while, in the latter case, a small quantity of water originally contaminated in the methanol together with the condensed water from the atmosphere along with the rapid evaporation of the methanol was effective. When the powder is thoroughly dried, however, the content of water in the powder decreases to such a level that the J-aggregate once formed is decomposed. There are some kinds of cyanine dyes which can retain J-aggregates still after thorough drying.

The inventors have found out, as a result of investigations based on the observations described above, a method of forming J-aggregates of cyanine or cyanine-like dyes on zinc oxide surface by using a certain amount of water in the blending operation with a resinous binder. In spite of presumable poor dispersion of zinc oxide in a resinous binder due to the presence of a considerable amount of water (adsorbed water layer) on the zinc oxide surface, blending by means of homogenizer or ball mill gave rise to a well dispersed, homogeneous coating comparable to that obtained according to conventional methods and formulations.

Conventionally, moisture or water layer adsorbed on zinc oxide was regarded harmful to minute dispersion of zinc oxide into an organic solution of resinous binder inmiscible with water, sometimes causing poor dispersion or separation of aqueous droplets. This invention has a unique aspect since it aims to make a positive use of adsorbed moisture or water layer.

According to the present invention, a new method of spectral sensitization of zinc oxide is provided which comprises preparing a coating mixture comprising photoconductive zinc oxide powder and a water-insoluble, electrically insulating, film-forming resinous binder dissolved in an organic solvent, coating said coating mixture onto a substrate to form an electrophotographic light-sensitive layer, characterised in that on said zinc oxide powder is adsorbed at least one kind of dye selected from cyanine and merocyanine, which has substantially a planar molecular structure and can form a J-aggregate exhibiting a sharp spectral adsorption on zinc oxide, and that said coating mixture includes water at the amount ranging from 1% to 30% based on the weight of said zinc oxide at the time of coating, thus realizing a permanent J-agrregate on the resulting light-sensitive layer.

Suitable cyanine or merocyanine dyes for use in the present invention include anhydro-3,3'-di-$\beta$-carboxyethyl-9-ethylthiacarbocyanine hydroxide anhydro-3,3'-di-$\beta$-sulforethyl-5,5'-dichloro - 9 - ethylthiacarbocyanine hydroxide, and etc. Generally speaking, those which possess the above described properties, i.e., planar structure and capability of forming J-aggregate upon adsorption, are all included.

Typical insulating film forming binders for use in the present invention include thermoplastic and thermoset polymers such as polyvinylchloride, polyvinylacetates, polystyrene, polystyrene-polybutadiene copolymers, polymethacrylates, polyacrylics, polyacrylonitriles, alkyd resins, silicone resins, chlorinate rubber, epoxy resins including halogenated epoxy and phenoxy resins, phenolics, epoxy-phenolic copolymers, epoxy urea formaldehyde copolymers, epoxy melamine formaldehyde, polycarbonates, polyurethanes, polyamides, saturated polyesters, unsaturated polyesters cross-linked with vinyl monomers and epoxy esters, vinyl epoxy resins, tall-oil modified epoxys, and copolymers and mixtures thereof.

In particular, alkyd resins or epoxy esters crosslinked with osocyanate are preferable.

And further, a copolymer of styrene and butylmethacrylate, a methacrylate of alkyd and styrene containing an acid component such as acrylic acid, crotonic acid are also preferable.

However, insulating film forming components containing a heavy metal salt such as cobalt salt of naphthenic acid are improper for this invention, because the above mentioned metal salts oxidize the cyanine or merocyanine dyes used in this invention.

It has been proved that the incorporation of water into a homogeneous mixture comprising an organic solution of a resinous binder and photoconductive zinc oxide within the range defined above exhibits no harmful effect on the formation of a uniform layer. The most of the water seems to be stably adsorbed on zinc oxide surface, remaining in the layer even after drying of the solvent. The necessary amount of water to form a stable J-aggregate on zinc oxide surface depends on the surface area and the surface property of zinc oxide used, cyanine or merocyanine dyes used, as well as the amount of the dye. In case where zinc oxide powder having a mean diameter of about 0.5 micron, water content ranging from 1% to 30% based on the weight of zinc oxide should be present in the coating mixture.

Zinc oxide having a mean diameter of about 0.3 micron adsorbs 0.2% of water based on its own weight, when kept in equilibrium with an atmospheric air of about 60% R.H. at room temperature. This amount of water, however, is insufficient to give rise to a stable J-aggregate of a cyanine dye.

One may use additional compounds which can adsorb water better than zinc oxide, such as gelatin, potassium salt of polyvinyl-benzene sulfonic acid, which will be shown in the examples, casein, glue, polyhydric compounds, surface active agents, or hydroscopic inorganic salts, etc.

A high concentration of such humectic compounds should be avoided in the photoconductive layer since they have a deleterious effect on the insulating property of the layer. Thus, their quantity should preferably be limited lower than 1% of zinc oxide (by weight).

Now one conventional method of practice for comparison and several practical examples of the present invention will be illustrated.

A conventional method of spectral sensitization (for comparison).

100 mg. of anhydro-3,3'-di-β-carboxyethyl-9-ethylthiacarbocyanine hydroxide was dissolved in 400 ml. of methanol; in the resulting dye solution was dispersed 100 g. of photoconductive zinc oxide with the aid of ultrasonic wave, thereby the dye was adsorbed on the zinc oxide surface. The dyed zinc oxide powder was separated from the dispersion by means of centrifugal separator, then dried, and pressed. The pressed powder layer was subjected to spectral reflectance measurement. Three absorption peaks, in addition to one due to the intrinsic absorption of zinc oxide at 380 m$\mu$, appeared at 525, 560, and 600 m$\mu$ corresponding to the H-, M-, and J-band of the thiacarbocyanine dye, respectively. The M-and was most intense, J the next, and H the weakest.

100 g. of the thus prepared dyed zinc oxide was blended with 20 g. of vinyl chloride/vinyl acetate copolymer containing 70% weight of vinyl chloride having a polymerization number of 260 purchased under the tradename "Denka-Lac" #61 from Denki Kagaku Ind., Ltd., together with 100 g. of toluol as solvent. The blending was carried out with a porcelain ball mill for 10 hours. The resulting coating mixture was coated on a thin aluminum laminated paper base to give a dried thickness of about 8 microns. The whole operations described above were carried out at an atmosphere of 20° C., 50% R.H. of total darkness. The spectral reflectance of the dried coating was measured, which gave a curve essentially different from that of the dyed powder layer. The two peaks corresponding to the H and J-bands formerly observed disappeared, and the M-band shifted by about 10 m$\mu$ to a longer wavelength with a decreased absorption intensity. The coated sheet was then kept in a thermostat maintained at 40° C. for 20 hours so as to expel a residual solvent or moisture from the coating. Another measurement after this additional drying did not cause any change in the spectral reflectance curve.

As for the electrophotographic properties, this coating proved satisfactory, showing an initial potential of —300 volts, which decreased only by 8% in one minute dark decay. The spectral sensitivity of this coating measured by means of spectrograph is shown in FIG. 1, which has an increased spectral range of sensitivity having its maximum at 570 m$\mu$ as is expected from the spectral reflectance curve. The sensitivity to the white light from a source having color temperature of 3000° K. was 8 times faster than that of the corresponding unsensitized coating.

DETAILED DESCRIPTION OF PREFERRED EXAMPLES OF THE INVENTION

Example 1

A dye solution was prepared by dissolving 100 g. of anhydro - 3,3'-di-β-carboxyethyl-9-ethylthiacarbocyanine hydroxide into a mixture of 300 ml. of methanol and 100 ml. of water. 100 g. of zinc oxide was dispersed in this solution by means of ultrasonic stirring to adsorb the dye. The dispersed powder was collected centrifugally and dried in an oven kept at 60° C. until it still contained 20% by weight of the solvent based on its completely weight. This weight difference was thought due to the remaining water. A quick measurement of spectral reflectance was carried out with this wet powder. The resulting curve exhibited, besides the intrinsic absorption peak of zinc oxide, three absorption peaks at 525, 560, and 600 m$\mu$, corresponding to H-, M- and J-absorption, respectively. This time, the J-absorption surpassed by far the other two bands in absorption intensity, the M-band being the next. Thus, the reflectance curve was quite different from the one for the powder layer in the aforementioned example for comparison. In the course of further drying of this powder, one could observe a distinct range of color beginning at the point of moisture content of about 2% by weight, and approaching to the appearance quite similar to the dried powder in the example for comparison.

Figure 2:
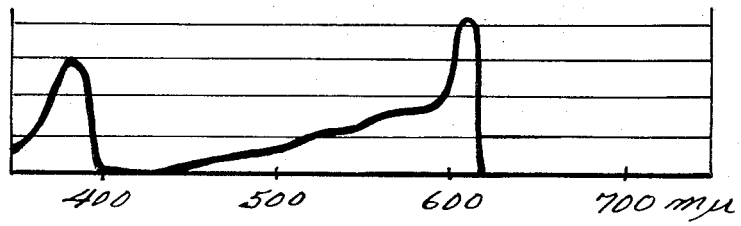

The inventors have succeeded in preparing an electrophotographic coating utilizing the dyed zinic oxide containing 20% by weight of water for its own weight. The informulation of the coating traced the above example except that the diluting solvent used was a mixture of 85% of toluol and 15 g. of methanol. The coating mixture was successfully coated in a similar manner on an aluminum foil. The resulting coating showed a reflectance curve similar to that for the moistened powder layer as for the relative intensities of the three peaks. The electrophotographic properties were measured at 20° C., 50% R.H. after drying for 20 hours at 40° C. The layer showed charge acceptance of —300 volts, 90% of which still remained after 1 minute dark decay. The spectral response characteristic curve measured by spectrograph gave, in addition to the intrinsic peak, three peaks in the extended region, among which the one owing to the J-aggregate exhibited the highest sensitivity. The accompanying drawing (FIG. 2) illustrates the spectral sensitivity curve for this coating, in which a sharp cut-off at the longer wavelength side of the J-band is prominent, unique to many J-aggregates. Again the absorption peaks for the powder layer shifted by 5 to 10 m$\mu$ to longer wavelength side in the binder coating. The speed of this coating to the white light having a color temperature of 3000° K. was about 10 times fastter than that of the unsensitized one.

Storage of this light-sensitive member in an air oven kept at 60° C. for 10 days did not cause any change in the spectral reflectance and sensitivity curves.

Example 2

The dyed zinc oxide powder prepared in the same process as was described in Example 1 was dried until the water content decreased to 3% of the zinc oxide. This powder was used for preparing a photoconductive coating in just the same manner as in the first example. The resulting coating showed the similar spectral reflectance as well as spectral sensitivity. The residual ratio of potential after 1 minute dark decay was 92%, and the photosensitive speed was about 10% slower than the coating in Example 1.

Example 3

This example differed from Example 2 only in that the sensitizing dye was replaced by anhydro-3,3'-di-β-sulfoethyl - 5,5' - di - chloro-9-ethylthiacarbocyanine hydroxide. The dye zinc oxide powder containing about 3% of water exhibited two absorption maxima at 580 and 640 m$\mu$, which are thought to originate in the M-band of the adsorbed dye. The maximum at 640 m$\mu$ had an absorption intensity about 2.5 times stronger than the other.

This maximum shifted to the longer wavelength by about 5 m$\mu$, when the powder was filled up in the binder to form a coating, while, on the other hand, the relative intensities of the two maxima remainder unchanged.

The residual ratio of the initial potential was 90% for 1 minute dark decay, and the speed to the white light (3000° K.) was about 1.5 times as fast as the coating of the second example.

Example 4

100 mg. of anhydro-3,3'-di-β-sulfoethyl-5,5'-dichloro-9-ethylthiacarbocyanine hydroxide was dissolved in 80 ml. of methanol. Separately, an aqueous gelatin solution was prepared by dissolving 50 mg. of gelatin in 20 ml. of water; this solution was poured into the dye solution. (If a clear solution does not result, a small amount of diluted hydrochloric acid may be added.) Then 100 g. of zinc oxide was dispersed in the mixed solution by means of ultrasonic homogenizer. After the dispersion was kept in a total darkness for 2 hours, the dyed zinc oxide was collected centrifugally and dried at darkness. The reflectance spectrum for the wet slurry was quite similar to that for the slurry described in Example 3, having an intense, sharp J-adsorption band near 640 m$\mu$, which could be observed until the moisture content in the slurry decreased to 1%. (Strictly speaking, the slurry must contain as volatile component a trace of methanol together with water.) It was quite difficult to evaporate this remaining moisture, which is considered to be firmly held by the hydrophilic gelatin in the slurry, requiring several hours of heating at 40° C. for evaporation. Gelatin molecules are probably adsorbed on zinc oxide surface together with the cyanine dye molecules. Further heating overnight remarkably decreases the J-absorption peak, raising up, on the other hand, the molecular band (M-band) at 580 m$\mu$.

In order to produce an electrophotographic coating utilizing the slurry prepared in this example, the powder containing about 3% of water was mixed with the binder solution and subjected to coating in the same manner as in the example for comparison. The resulting coating exhibited a potential acceptance of —280 volts, which decreased to 90% thereof after 1 minute dark decay at 20° C., 50% condition. The light-sensitive speed to the white light of 3000° K. was 0.9 times as fast as that of the coating in Example 3.

The reflectance spectrum and the spectral sensitivity showed substantially no change after 10-day storage in a thermostat kept at 60° C.

Example 5

This example only differed from Example 4 in that 100 mg. of potassium polyvinylbenzene sulfonate was used in place of 50 mg. of gelatin. This hydrophilic polymer proved to work as a water-preserving adsorbed material on zinc oxide surface.

The electrophotographic layer showed a potential acceptance of —250 volts which decreased to 89% thereof in 1 minute dark storage. The light sensitive speed was 1.2 times as fast as that for the layer in Example 4. The sensitivity and reflectance spectrum of the layer would not undergo any change by 10-day storage in an oven kept at 60° C.

Example 6

The recording material prepared in Example 5 was subjected to electrolytic development by 0.5% aqueous solution of triphenyltetrazonium chloride after exposed to an optically negative image by means of a photo-flood lamp of 3000° K. The lamp was placed at such a distance as to give a luminance of 1000 lux on the zinc oxide coating, the exposure time being 10 seconds.

After the exposure, electrolytic development was carried out by placing the exposed sheet in the bath with application of 10 volts D.C. between the conductive support for the coating as cathode and a platinum counter electrode immersed in the bath, for 15 seconds. A positive reproduction of the light image having magenta appearance resulted.

Example 7

In 80 ml. of methanol was dissolved 50 mg. of fluorescein, 40 mg. of erythrosine, and 100 mg. of anhydro-3,3'-di-$\beta$-sulfoethyl - 5,5' - dichloro-9-ethylthiacarbocyanine hydroxide. To this solution was added 50 mg. of gelatin dissolved in 20 ml. water. 100 g. of zinc oxide was dispersed in the resulting solution with an ultrasonic blender, the resulting dispersion being allowed to stand in the dark for 4 hours. By collecting the dyed zinc oxide by a centrifugal separator, a wet, colored slurry was obtained. Measurement on the spectral reflectance of this slurry showed that it had a sharp J-absorption band due to the J-aggregate of the thiacarbocyanine dye used as well as three absorption maxima due to the intrinsic absorption of zinc oxide, fluorescein, and erythrosine. This result disclosed that the presence of other dyes such as fluorescein, and erythrosine adsorbed on zinc oxide does not disturb the formation of the J-aggregate of this cyanine dye. As regards the shape and the wavelength of the J-band, the reflectance curve was quite similar to that obtained in Example 3. This slurry was dried to water content of about 7%, and used to provide an electrophotographic coating in the same manner as was described in the example for comparison. The resulting light-sensitive material had an excellent electrophotographic property; the initial potential value 280 volts at 20° C., 50% R. H. decreased to 88% thereof after 1 minute dark storage. Twenty-five times faster speed to the white light of 3000° K. was obtained as compared with the non-sensitized material.

This material proved to provide an acceptable image when used for electrolytic electrophotography in the same way as in Example 6, showing a speed twice higher than the coating in that example.

Example 8

The slurry in the above example was blended with a styrenated alkyd resin after dried to 5% water content. Blending was carried out by a homogenizer for 15 minutes which was charged with 100 g. of the dyed zinc oxide, 12 g. of the styrenated alkyd resin, and 80 g. of toluol. Then 75% ethyl acetate solution of polyisocyanate compound purchased under the tradename "Desmodur L–75" from Bayer Chemische Werke in West Germany was added by 11 g. together with 20 g. of butyl acetate to the mixture, then another minute of stirring was made. The resulting coating mixture was coated, in a similar manner as was described in Example 1, onto an aluminum foil; the coated foil was dried for 20 hours in a thermostat kept at 40° C.

Measurements on electrophotographic properties gave an initial potential of —350 volts at 20° C., 50% R. H. 93% of which was retained after 1 minute dark decay. The light-sensitive speed to a white light of 3000° K. was 1.2 times as fast as that for the coating in Example 7.

When this piece was subjected to electrolytic electrophotography processes according to the operations described in Example 6, it gave a speed about $\frac{1}{10}$ as slow as the coating in Example 7.

The polyisocyanate compound reacts with styrenated alkyd very rapidly. A great excess of isocyanate radical was used to the hydroxyl radical present in the styrenated alkyd, and against the expectation that the excess isocyanate might react with the water contained in the slurry to destroy the J-aggregate of the cyanine dye used, the J-band was stably observed in the final coating. The infrared absorption spectrum of the dried coating disclosed a peak due to the remaining —NCO group which proved to survive almost infinitely.

Example 9

The spectral sensitizer in this example was 3-carboxyethyl-5-[(3-ethoxycarbonylmethyl - 2(3H) - thiazolinylidene)ethylidene] rhodanine, which belongs to merocyanine dye. It proved that the formation of J-aggregate was more difficult for this dye than for cyanine dyes. 100 parts by weight of zinc oxide was thrown into a dye solution comprising 200 parts by weight of methanol, 200 parts of water, and 0.05 part of the merocyanine dye and thoroughly agitated to absorb the dye. The zinc oxide was separated centrifugally and dried to a state containing 20% of the solvent based on the zinc oxide. The measurement of the spectral reflectance characteristic of the wet paste disclosed absorption maxima at 495 m$\mu$ and 530 m$\mu$, the latter corresponding to the J-band of the dye. When the dye was absorbed from a water-free dye solution, and the zinc oxide was dried completely the maximum at the longer wavelength was not observed.

An electrophotographic layer was prepared in a similar manner to the procedures described in Example 1 with the wet zinc oxide paste. The spectral reflectance curve of the dried layer had an absorption peak at 530 mµ. Also a peak of spectral sensitivity was observed at the same region.

Though in this case the sensitivity at the J-absorption did not exceed the normal absorption region of the dye, the sensitivity region could be expanded to a longer wavelength.

What we claim is:

1. A method of forming an electrophotographic light-sensitive coating on a support by coating with a homogeneous coating mixture comprising photoconductive zinc oxide having adsorbed thereon one or more kinds of sensitiziing dye selected from the group comprising cyanine and merocyanine, said dye having a substantially planar molecular structure and being capable of forming a J-aggregate when adsorbed on zinc oxide surface, exhibitng a sharp spectral absorption due to said aggregate, and an organic solvent solution of a water-insoluble electrically insulating film-forming resinous binder, said zinc oxide being dispersed in said solution, which is characterized by that said coating mixture contains 1% to 30% water based on the weight of zinc oxide incorporated therein, so as to give rise to maximum stabilization of the J-aggregate on the electrophotographic light-sensitive coating finally obtained from said mixture.

2. A method of forming an electrophotographic light-sensitive coating on a support claimed in claim 1, wherein said sensitizing dye is anhydro-3,3'-di-β-carboxyethyl-9-ethylthiacarbocyanine hydroxide, or anhydro-3,3'-di-β-sulfoethyl - 5,5' - dichloro - 9 - ethylthiacarbocyanine hydroxide.

3. A method of forming an electrophotographic light-sensitive coating on a support claimed in claim 1, wherein said insulating film-forming resinous binder is an alkyd resin or epoxy ester cross-linked with isocyanate, a copolymer of styrene and butylmethacrylate, or a methacrylate or alkyd nad styrene containing an acid component consisting of an crylic acid or a crotonic acid.

4. A method of forming an electrophotographic light-sensitive coating on a support claimed in claim 1, wherein said electrophotogtraphic light-sensitive coating further contains a hydrophilic compound which can adsorb water better than zinc oxide, the amount of said hydrophilic compound being less than 1% by weight of said zinc oxide.

5. A method of forming an electrophotographic light-sensitive coating on a support claimed in claim 4, wherein said hydrophilic compound is gelatin, potassium salt of polyvinylbenzene sulfonic acid, casein or glue.

References Cited

UNITED STATES PATENTS

| | | | |
|---|---|---|---|
| 3,347,702 | 10/1967 | Clancy | 117—201 |
| 3,128,179 | 4/1964 | Kendall et al. | 96—1.7 X |
| 3,447,957 | 6/1969 | Behringer | 117—201 |
| 3,399,060 | 8/1968 | Clancy | 117—201 X |
| 3,471,625 | 10/1969 | Adams et al. | 117—201 X |
| 3,428,452 | 2/1969 | Giaimo | 96—1.7 |
| 3,455,684 | 7/1969 | Depoorter et al. | 96—1.7 |
| 3,476,558 | 11/1969 | Depoorter et al. | 96—1.7 |
| 3,236,678 | 2/1966 | Waring | 117—34 X |

OTHER REFERENCES

Hamer, F. M., The Cyanine Dyes and Related Compounds, Wiley & Sons (Interscience Div.), New York, 1964, pp. 298-9.

RALPH S. KENDALL, Primary Examiner

K. P. GLYNN, Assistant Examiner

U.S. Cl. X.R.

96—1.7; 117—34